United States Patent
Lewis et al.

(10) Patent No.: US 8,046,470 B2
(45) Date of Patent: Oct. 25, 2011

(54) METHOD AND SYSTEM FOR INCOMING CALL NOTIFICATION

(75) Inventors: Ronald E. Lewis, Independence, MO (US); Charles E. Woodson, Peculiar, MO (US); Baoquan Zhang, Overland Park, KS (US); Arun Santharam, Overland Park, KS (US); Daren R. Furness, Shawnee Mission, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2343 days.

(21) Appl. No.: 10/224,208

(22) Filed: Aug. 20, 2002

(65) Prior Publication Data

US 2002/0194331 A1    Dec. 19, 2002

Related U.S. Application Data

(63) Continuation-in-part of application No. 09/708,836, filed on Nov. 8, 2000, now Pat. No. 6,944,150.

(51) Int. Cl.
*G06F 15/16* (2006.01)
*H04M 3/42* (2006.01)

(52) U.S. Cl. ............ 709/227; 379/215.01; 455/414.1

(58) Field of Classification Search .......... 709/201–253; 455/401–466; 370/351–357; 379/93.35, 379/100.06, 93.01, 142.01–142.09
See application file for complete search history.

(56) References Cited

U.S. PATENT DOCUMENTS

| | | | |
|---|---|---|---|
| 5,806,000 A | 9/1998 | Vo et al. | |
| 6,049,713 A | 4/2000 | Tran et al. | |
| 6,058,305 A | 5/2000 | Chavez | |
| 6,138,006 A | 10/2000 | Foti | |
| 6,311,057 B1 | 10/2001 | Barvesten | |
| 6,327,478 B1 | 12/2001 | Baker | |
| 6,351,460 B1 * | 2/2002 | Tiedemann et al. | 370/332 |
| 6,414,938 B1 * | 7/2002 | Corke et al. | 370/231 |
| 6,625,198 B1 * | 9/2003 | Tiedemann et al. | 375/130 |
| 6,633,635 B2 * | 10/2003 | Kung et al. | 379/215.01 |
| 6,801,781 B1 * | 10/2004 | Provost et al. | 455/466 |
| 6,804,518 B2 * | 10/2004 | Core et al. | 455/436 |
| 6,845,236 B2 * | 1/2005 | Chang | 455/414.1 |
| 6,956,831 B1 * | 10/2005 | Mahr | 370/310 |

(Continued)

FOREIGN PATENT DOCUMENTS

| | | |
|---|---|---|
| EP | 1 003 343 A1 | 5/2000 |
| EP | 1 119 168 A2 | 7/2001 |
| WO | WO 98/36542 | 8/1998 |
| WO | WO 00/22792 | 4/2000 |
| WO | WO 02/39669 A2 | 5/2002 |

OTHER PUBLICATIONS

Handley, M. et al. "Request for Comments (RFC) 2543: SIP: Session Initiation Protocol", published by Network Working Group, Mar. 1999, 153 pages.*

(Continued)

*Primary Examiner* — George Neurauter

(57) ABSTRACT

A mobile station that is fully engaged such that it cannot be connected to an incoming call without being disconnected from an existing call receives an incoming call notification. The incoming call notification may, for example, take the form of a short message system (SMS) message or a packet protocol message, such as a session initiation protocol (SIP) message. The incoming call notification may identify the calling party and may explain how to take the incoming call. If the user accepts the incoming call, the mobile station is disconnected from existing calls and connected to the incoming call.

20 Claims, 4 Drawing Sheets

U.S. PATENT DOCUMENTS

| | | | | |
|---|---|---|---|---|
| 7,126,939 | B2* | 10/2006 | Barany et al. | 370/352 |
| 7,130,285 | B2* | 10/2006 | Chang | 370/331 |
| 2002/0181674 | A1* | 12/2002 | Cannell et al. | 379/93.01 |
| 2004/0092252 | A1* | 5/2004 | Gustavsson et al. | 455/412.2 |

OTHER PUBLICATIONS

European Telecommunication Standards Institute. "Digital cellular telecommunications system (Phase 2+); Technical reailization of the Short Message Service (SMS); Point-to-Point (PP) (GSM 03.40 version 7.2.0 Release 1998)", TS 100 901, v7.2.0, Jul. 1999, 118 pages.*

Zuidweg, Han ,"The Evolution of IN Service Logic", Alcatel, 1998 IEEE, p. 14-27 (14 pages).

C. Rigney, et al., "Remote Authentication Dial In User Service (Radius)", RFC 2138, Apr. 1997, p. 1-46.

C. Rigney, et al., "RADIUS Accounting", RFC 2139, Apr. 1997, p. 1-18.

N. Brownlee, et al., "Accounting Attributes and Record Formats", RFC 2924, Sep. 2000, p. 1-26.

B. Campbell, et al., "Session Initiation Protocol Extension for Instant Messaging", Internet draft, Jul. 24, 2002, p. 1-17.

J. Rosenberg, et al., "SIP: Session Initiation Protocol", RFC 3261, Jun. 2002, p. 1-189.

Pat R. Calhoun, et al., "Diameter Base Protocol", Internet Draft, Jun. 2002, p. 1-115.

Telecommunications Industry Association, "Wireless Features Description: Call Waiting," TIA/EIA/664-507-A, dated Jul. 2000.

3rd Generation Partnership Project 2, "3GPP2 Access Network Interfaces Specification," 3GPP2 A.S0001.1, dated Jun. 2000.

3rd Generation Partnership Project 2, "3GPP2 Access Network Interfaces Interoperability Specification," 3GPP2 A.S0001-A, dated Nov. 30, 2000.

* cited by examiner

METHOD AND SYSTEM FOR INCOMING CALL NOTIFICATION

CROSS-REFERENCE TO RELATED APPLICATIONS

This is a continuation-in-part of U.S. patent application Ser. No. 09/708,836, filed Nov. 8, 2000 now U.S. Pat. No. 6,944,150, which application is fully incorporated herein by reference.

BACKGROUND

1. Field of the Invention

The present invention relates to telecommunications and, more particularly, to methods and systems for notifying mobile stations of incoming calls.

2. Description of Related Art

A wireless service subscriber who has call waiting is able to receive notification of an incoming call when engaged in a voice call. Typically, the subscriber's mobile station provides an audible indication of the incoming call and visibly displays an identification of the calling party. The subscriber is then able to signal the wireless telecommunications network, such as by pressing the SEND button on the mobile station, to put the first call on hold and connect the incoming call.

Existing call waiting services have significant limitations, however. Call waiting is typically not available when a subscriber is already using call waiting to maintain two calls or when the user is engaged in a three-way call. In particular, because of network and/or mobile station limitations, wireless networks typically limit the number of call legs that a mobile station can maintain at one time. Thus, when a subscriber is using the maximum number of call legs that the wireless network allows, the subscriber will typically not receive any indication if another request to terminate a call to the mobile station comes in.

Call waiting may also be unavailable when the mobile station is involved in an active data session. For example, the CDMA 2000 3G1x standard does not support simultaneous voice and data transmission to the mobile station. As a result, if the mobile station is involved in an active data session it will not receive any notification of incoming voice calls. In other implementations, the mobile station may be able to maintain simultaneous voice calls and active data sessions, albeit up to a maximum number.

Thus, when a mobile station is fully engaged such that it cannot be connected to another call without being disconnected from an existing call (either because it is using all available call legs or because it is involved in an active data session) the mobile station will not be notified of incoming calls. As a result, the user may miss important calls when the user's mobile station is fully engaged. Indeed, the user may not realize that anyone is trying to call him while his mobile station is fully engaged.

Accordingly, there is a need to provide an incoming call notification to mobile stations that are fully engaged.

SUMMARY

In a first principal aspect, the present invention provides a method of incoming call notification for a mobile station that is connected to at least one call over an air interface. In accordance with the method, a request to connect an incoming call to the mobile station is detected. A determination is made whether the mobile station is fully engaged such that it cannot be connected to the incoming call without being disconnected from at least one of its current calls. If the mobile station is fully engaged, an incoming call notification is transmitted to the mobile station.

In a second principal aspect, the present invention provides a system for notifying a mobile station of an incoming call. The system comprises a call connection system for connecting calls to the mobile station over an air interface, and a call control system for controlling the call connection system. The call control system runs service logic for formulating an incoming call notification to the mobile station when the mobile station is fully engaged.

In a third principal aspect, the present invention provides a method of handling an incoming call for a mobile station that is connected to at least one call over an air interface. In accordance with the method, a first attempt to connect an incoming call from a calling party to the mobile station is made. The first attempt is determined to be unsuccessful. In response, an incoming call notification is transmitted, and a second attempt to connect the incoming call from the calling party to the mobile station is made.

DETAILED DESCRIPTION OF EXEMPLARY EMBODIMENTS

1. Exemplary Architecture

Figure 1:
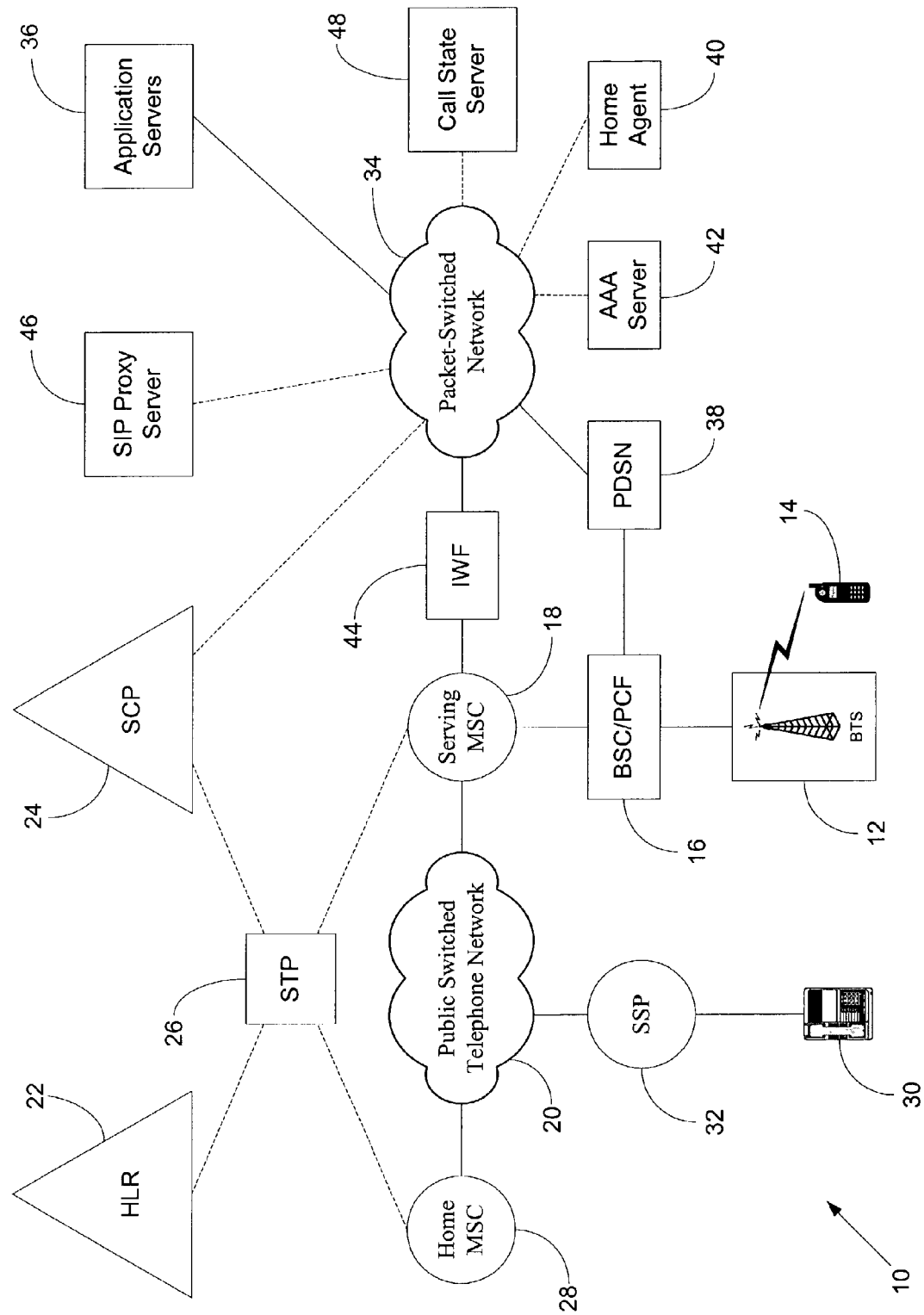
FIG. 1 is a simplified block diagram of a wireless telecommunications system, in accordance with an exemplary embodiment of the present invention.

Referring to the drawings, FIG. 1 is a simplified block diagram of an exemplary wireless telecommunications system 10 in which exemplary embodiments of the present invention may be employed. In FIG. 1, dotted lines indicate connections that carry primarily signaling traffic, and solid lines indicates connections that carry bearer traffic, such as voice, data, or other media.

Wireless telecommunications system 10 includes a base transceiver station (BTS) 12 that provides a wireless coverage area within which BTS 12 may communicate with one or mobile stations, such as mobile station 14, over an air interface. Mobile station 14 may be a wireless telephone, a wireless personal digital assistant (PDA), a wirelessly equipped laptop computer, or other such device. The communications between BTS 12 and mobile station 14 may occur in a digital format, such as CDMA, TDMA, or GSM, or they may occur in an analog format, such as AMPS. A preferred wireless communications format is "CDMA 2000," such as described in EIA/TIA/IS-2000 Series, Rev. A (published March 2000), which is incorporated herein by reference.

BTS 12 is controlled by a base station controller (BSC) 16, which, in turn, is controlled by a serving mobile switching center (MSC) 18. Serving MSC 18 is connected to the public switched telephone network (PSTN) 20. Serving MSC 18 is also able to signal to the home location register (HLR) 22 of mobile station 14 and to a service control point (SCP) 24. This signaling may occur via one or more signal transfer points (STPs), such as STP 26. Although FIG. 1 shows serving MSC 18 connected to one BSC and shows BSC 16 connected to one BTS, in general, serving MSC 18 may be connected to more than one BSC and each BSC, such as BSC 16, may be connected to more than BTS.

Mobile station 14 is also associated with a home MSC 28. Specifically, mobile station 14 may have a directory number allocated to home MSC 28, such that calls to that directory number are routed to home MSC 28. Home MSC 28 is connected to PSTN 20. MSC 28 is also able to signal HLR 22 and SCP 24, such as via STP 26. For the sake of simplicity, home MSC 28 is not shown connected to any BSC in FIG. 1. However, it is to be understood that home MSC 28 may, like serving MSC 18, be connected to one or more BSCs, which, in turn, may be connected to one or more BTSs.

PSTN 20 is also connected to landline telephones, such as telephone 30, typically via switching systems, such as service switching point (SSP) 32. Although FIG. 1 shows PSTN 20 connected to only two MSCs and one SSP, in general, PSTN 20 is connected to many MSCs and many SSPs. In addition, PSTN 20 may be connected to other types of telecommunications systems. For example, PSTN 20 may be connected to various gateways in order to send calls to or receive calls from packet-switched networks, such as the Internet. The packet-switched networks may carry such calls in a packet-based format, such as a voice over Internet Protocol (VoIP) format.

The systems connected to PSTN 20, such as serving MSC 18, home MSC 28, and SSP 32, may use a signaling system, such as SS7, to route calls through PSTN 20. The signaling between serving MSC 18, home MSC 28, and HLR 22 may conform to IS-41 specifications. A recent revision of the IS-41 specifications, ANSI-41 Rev. D, published in July 1997, is incorporated herein by reference. The signaling between serving MSC 18, home MSC 28, and SCP 24 may conform to the specification "Wireless Intelligent Network," TIA/EIA/IS-771, published in July 1999, which is incorporated herein by reference. Other signaling protocols could be used, however. In this way, serving MSC 18, BSC 16, and BTS 12 may connect incoming calls from PSTN 20, which calls may originate from calling parties using landline telephones, mobile stations, or other communication devices, to mobile station 14. Similarly, serving MSC 18, BSC 16, and BTS may connect calls originating from mobile station 14 to their destinations, via PSTN 20.

Mobile station 14 may also be able to access packet-based services via a packet-switched network 34, such as the Internet. Such packet-based services may include e-mail, wireless web browsing, instant messaging, and "push-to-talk" teleconferencing, for example. These packet-based services may be provided by one or more application servers 36.

To provide access to packet-switched network 34 and application servers 36, BSC 16 may include a packet control function (PCF), and a packet data serving node (PDSN) 38 may connect BSC/PCF 16 to packet-switched network 34. The communications between BSC/PCF 16, serving MSC 18, and PDSN 38 may conform to "third generation" (3G) specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference. Briefly stated, under these 3G specifications, when mobile station 14 requests packet data service, BSC/PCF 16 engages in signaling with serving MSC 18 and with PDSN 38 to authenticate and authorize mobile station 14 and to set up a data link with PDSN 38. If this process is successful, a point-to-point protocol (PPP) session is established between mobile station 14 and PDSN 38. PDSN 38 may also dynamically assign an Internet Protocol (IP) address to mobile station 14. Alternatively, mobile station 14 may use Mobile IP, in which case mobile station 14 sends a registration request, via PDSN 38, to a home agent 40. If home agent 40 approves the registration request, home agent 40 may dynamically assign mobile station 14 an IP address, or mobile station 14 may use an IP address permanently assigned to it. PDSN 38 then acts as a network access server, providing mobile station 14 access to packet-switched network 34.

PDSN 38 may exchange messages with an authentication, authorization, and accounting (AAA) server 42, such as via packet-switched network 34. For example, PDSN 38 may query AAA server 42 to authenticate and authorize requests by mobile stations, such as mobile station 14, for access to packet-switched network 34. PDSN 38 may also send status messages to AAA server 42 when PDSN 38 starts and stops delivering packet data services to mobile stations, such as mobile station 14. The communications between PDSN 38 and AAA server 42 may conform to the RADIUS protocols specified in "Remote Authentication Dial In User Service (RADIUS)," Request For Comments 2138 (April 1997) and "RADIUS Accounting," Request For Comments 2139 (April 1997), which are incorporated herein by reference. Alternatively, the communications with AAA server 42 may conform to the DIAMETER protocol specified in Calhoun, et al., "Diameter Base Protocol," Internet-Draft (June 2002), or to some other protocol.

In an alternative approach for providing access to packet-switched network 34, serving MSC 18 may be connected to packet-switched network 34 via an interworking function (IWF) 44. Serving MSC 18 and IWF 44 may allow mobile stations, such as mobile station 14, to access packet-switched network 34 in circuit-switched data (CSD) sessions.

Many other types of servers may also be connected to packet-switched network 34. For example, communications sessions through packet-switched network 34 may by initiated using the Session Initiation Protocol (SIP). Accordingly, one or more SIP servers, such as SIP proxy server 46, may be connected to packet-switched network 34. SCP 24 may also be connected to packet-switched network 34 and may use the SIP protocol for communications via packet-switched network 34. Relevant aspects of SIP are described in J. Rosenberg, et al., "SIP: Session Initiation Protocol," Request For Comments 3261 (June 2002) and J. Rosenberg, "Session Initiation Protocol Extensions for Instant Messaging," Internet Draft (May 3, 2002), which are incorporated herein by reference.

A call state server 48 may also be connected to packet-switched network 34. As described in more detail below, call state server 48 obtains and maintains information regarding the call state of mobile stations, such as mobile station 14. Such call state information may include the number and types of calls in which the mobile station is engaged.

2. Exemplary Operation

Figure 2:
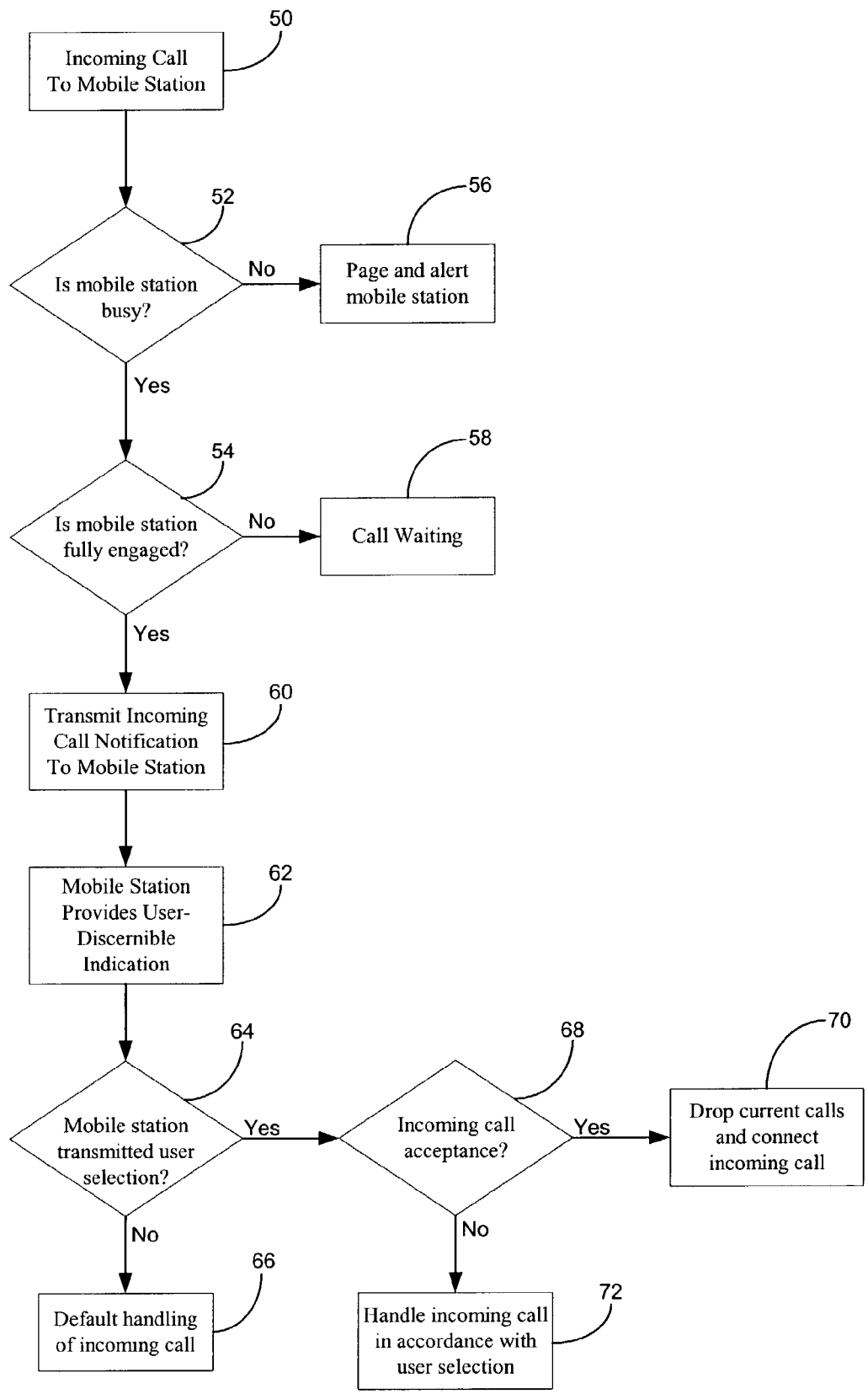
FIG. 2 is a flow chart illustrating an incoming call notification service, in accordance with an exemplary embodiment of the present invention.

FIG. 2 is a flow chart illustrating, at a high level, the overall operation of a call notification service in accordance with an exemplary embodiment. The process begins when the wireless telecommunications network detects an incoming call to a mobile station that it is serving, as indicated by block 50. To determine whether it can terminate the incoming call to the mobile station, the network determines the call state of the mobile station, as indicated by blocks 52 and 54. In particular, the network may determine whether the mobile station is busy, as indicated by block 52. If the mobile station is not busy, then the network may page and alert the mobile station, as indicated by block 56. The incoming call is then connected when the mobile station answers. If the mobile station is busy, then the network may determine whether the mobile station is "fully engaged," as indicated by block 54.

As used herein, a mobile station is "fully engaged" when it cannot be connected to an incoming call without being disconnected from an existing call. Being disconnected from a call may be distinguished from putting a call on hold or suspending the call, as is done with call waiting. Once a call, e.g., a call involving two parties, is disconnected, circuits or other resources are released. In order for the parties to be re-connected, typically a new call must be originated, such as by one of the parties dialing the other party's telephone number.

A mobile station may be fully engaged because it is using the maximum number of call legs allowed it, e.g., because of call waiting or three-way calling. In some embodiments, a mobile station may be fully engaged if it is engaged in a single active data session. In other embodiments, an active data session may not be sufficient to fully engage the mobile station; the mobile may instead be fully engaged if, for example, it is engaged in one active data session and one or more voice calls.

If the mobile station is not fully engaged, then the network may use a call waiting procedure to allow the user to put an existing call on hold and connect the incoming call, as indicated by block 58. If the mobile station is fully engaged, then the network transmits an incoming call notification message to the mobile station, as indicated by block 60.

In response to the incoming call notification, the mobile station preferably provides a user-discernible indication that the user may take an incoming call, as indicated by block 62. The user-discernible indication may be visual. For example, the mobile station may display text, such as an incoming call notification message, and/or graphics on its screen, or the mobile station may light or flash an indicator light. Alternatively, or additionally, the mobile station may provide an audible indication to the user, such as a click or a tone, or a tactile indication, such as a vibration. In a preferred embodiment, the user-discernible indication includes an incoming call notification message that identifies the caller, such as by name and/or telephone number.

Preferably, the user is then able to signal a desired manner of handling the incoming call. For example, the user may be able to signal that the user wishes to drop existing calls and accept the incoming call by pressing a button on mobile station, such as the END button, by pressing a series of buttons, by interacting with a touch sensitive screen, by speaking a voice command, or by interacting with mobile station in some other fashion. The user may also be able to signal that the incoming call should be handled in some other fashion. For example, the user may have the option of sending the incoming call to a voice mail system or to another telephone number. When the user signals a desired manner of handling the incoming call, the mobile station responsively transmits the user's selection to the network.

The user-discernible indication provided by the mobile station may also indicate to the user the options available for handling the incoming call and may indicate how the user may choose each option. For example, the mobile station may display on its screen text that explains that the user may drop existing calls and take the incoming call by pressing a button, such as the END button. The text may also identify other options available to the user and how the user may choose them. Alternatively, the user may be able to have the mobile station respond to some or all incoming call notifications in a predetermined, automatic fashion. For example, the user may be able to have the mobile station automatically ignore incoming call notifications from certain callers or automatically accept calls in response to incoming call notifications from certain callers.

The mobile station may be programmed with one or more message-handling applications that control the operation of the mobile station in response to incoming call notifications. For example, the message-handling application may display text or graphics on the screen or generate an audible indication in accordance with the information provided in the incoming call notification. The message-handling application may also specify what the mobile station transmits in response to the incoming call handling options selected by the user.

After transmitting the incoming call notification, the network determines whether the mobile station has transmitted a user selection within the allotted time period, as indicated by block 64. If the mobile station has not, indicating that the user has not chosen to accept the incoming call or to specify any other handling of the incoming call, then the network may handle the incoming call in a default manner, as indicated by block 66. Such default handling may, for example, include sending the incoming call to the mobile station user's voice mail.

If the mobile station has transmitted a user selection, the network determines whether the user selection is an incoming call acceptance, as indicated by block 68. If the user selection is an incoming call acceptance, then the network drops one or more calls in which the mobile station is currently engaged and connects the incoming call to the mobile station, as indicated by block 70. If the user selection specifies some other handling of the incoming call, such as sending it to another telephone number, then the network handles the incoming call in accordance with the user selection, as indicated by block 72.

Figure 3:
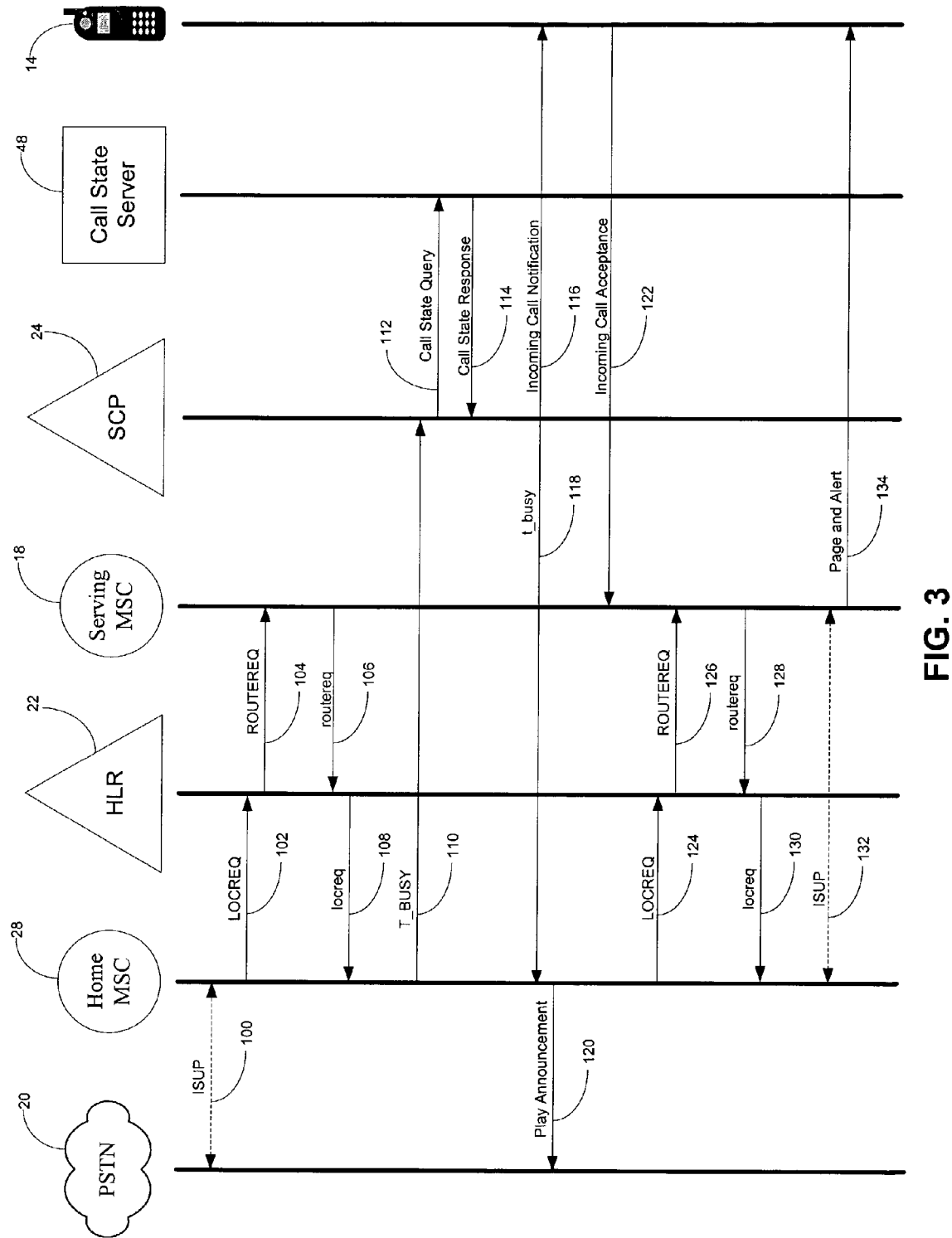
FIG. 3 is a simplified call flow diagram illustrating an incoming call notification service, in accordance with an exemplary embodiment of the present invention.

The operations illustrated in FIG. 2 may be carried out in wireless telecommunications network 10 shown FIG. 1. FIG. 3 shows a simplified call flow for how this may be accomplished in an exemplary embodiment. Thus, in the call flow of FIG. 3, it is assumed that mobile station 14 is communicating with wireless telecommunications network 10 over an air interface, as shown in FIG. 1.

The process begins when a caller initiates a call to mobile station 14, such as by dialing a directory number corresponding to mobile station 14. The caller may be using a landline telephony device, such as telephone 30, or a fax machine or a modem. Alternatively, the caller may be using a mobile station, such as a wireless telephone, wireless PDA, or wirelessly equipped laptop computer. In other cases, the caller may be using some other type of device to call mobile station 14. The call may reach PSTN 20 via a switching system, such as SSP 32 or home MSC 28. Alternatively, the call may reach PSTN 20 via a gateway, such as may occur if the caller uses VoIP.

However the call is originated, in step 100 the call is routed from PSTN 20 to home MSC 28, the network element assigned to the directory number that the caller dialed. In an exemplary embodiment, step 100 may involve the exchange of SS7 ISUP signals.

In the example of FIGS. 1 and 3, mobile station 14 is roaming in that it is operating outside of the area being served by home MSC 28. As a result, home MSC 28 engages in signaling, such as IS-41 signaling, to locate mobile station 14 and to route the call to mobile station 14.

For example, home MSC 28 may send to HLR 22 an IS-41 LOCREQ invoke identifying mobile station 14 as the called party, as shown in step 102. In response, HLR 22 determines that mobile station 14 is being served by serving MSC 18.

Then, HLR 22 sends to serving MSC 18 an IS-41 ROUTEREQ invoke identifying mobile station 14, as shown in step 104.

When serving MSC 18 receives the ROUTEREQ of step 104, it determines whether mobile station 14 is available to take the incoming call. Specifically, if mobile station 14 is not engaged in any call, then serving MSC 18 may simply page and alert mobile station 14 to try to connect the incoming call. If mobile station 14 is engaged in a call but not fully engaged, then serving MSC 18 may use call waiting to notify the user of the incoming call. In either case, serving MSC 18 would typically respond to the ROUTEREQ with a temporary location directory number (TLDN) that home MSC 28 may use to route the call to serving MSC 18.

In the case illustrated in FIG. 3, however, serving MSC 18 determines that mobile station 14 is fully engaged. For example, MSC 18, like many commercially available MSC's, may have built-in software that keeps track of whether mobile stations it is serving, such as mobile station 14, are fully engaged. As a result, mobile station 14 cannot be connected to the incoming call without being disconnected from an existing call. Moreover, because the mobile station is fully engaged, call waiting is not available to notify the user of the incoming call. Accordingly, serving MSC 18 sends to HLR 22 an IS-41 routereq return result that identifies mobile station 14 and indicates that it is busy, as shown in step 106. The routereq return result of step 106 may also indicate how mobile station 14 is busy. For example, the routereq return result of step 106 may indicate whether mobile station 14 is engaged in voice calls or in an active data session. In step 108, HLR 22 sends to home MSC 28 a locreq return result indicating that mobile station 14 is busy.

When home MSC 28 receives the locreq return result of step 108, indicating that mobile station 14 is busy, home MSC 28 may send to SCP 24 an IS-771 T_BUSY invoke in order to receive instructions on how to handle the incoming call, as shown in step 110. The T_BUSY invoke of step 110 identifies the caller and mobile station 14, and it indicates that mobile station 14 is busy. If the routereq return result that home MSC 28 received in step 108 indicated how mobile station 14 was busy, then the T_BUSY invoke of step 110 may also include this information. Of course, in the case mobile station 14 is not roaming but instead operating in the area served by home MSC 28, then home MSC 28 may send a T_BUSY invoke to SCP 24 without first sending a LOCREQ invoke to HLR 22.

When SCP 24 receives the T_BUSY invoke of step 110, SCP 24 may obtain a service profile corresponding to mobile station 14 and may also execute service logic to determine how to respond. The service profile may indicate whether the user of mobile station 14 subscribes to the incoming call notification service of the present invention; it may also include parameters specifying under what conditions mobile station 14 should receive an incoming call notification and how it should be sent. For example, the user may wish to receive an incoming call notification from only certain callers.

SCP 24 may also query one or more network elements to determine how to provide the incoming call notification. In a preferred embodiment, before transmitting the incoming call notification SCP 24 first determines how mobile station 14 is fully engaged, e.g., whether mobile station 14 fully engaged by voice calls or by an active data session. SCP 24 may make this determination by sending a call state query identifying mobile station 14 to call state server 48, as shown in step 112. In response, call state server 48 may send to SCP 24 a call state response that specifies how mobile station 14 is fully engaged, as shown in step 114. For example, the call state response may specify whether the mobile station 14 is engaged in voice calls or in an active data session. If mobile station 14 is engaged in an active data session, the call state response may also indicate what type of data session. For example, the call state response may indicate whether mobile station 14 is engaged in a data session that is sensitive to delay associated with sending the incoming call notification to mobile station 14. Such delay-sensitive data sessions may include real-time media sessions, such as VoIP teleconferencing. Other activities, such as web browsing or e-mail retrieval may not be as sensitive to delays caused by the incoming call notification.

SCP 24 then formulates an incoming call notification. In many cases, the incoming call notification may be transmitted to mobile station 14. In other cases, however, the incoming call notification may be transmitted to an alternate device associated with the user of mobile station 14, such as a pager, a PDA, a laptop computer, or a desktop computer, with or without a wireless connection. As described in more detail below, the user's service profile and service logic executed by SCP 24 may determine where the incoming call notification should be sent.

A number of different approaches exist for providing this incoming call notification. One approach is to use short message service (SMS) messages, such as those defined in IS-637 specifications. This approach is preferred when the mobile station is engaged in one or more voice calls. Another approach is to use packet protocol messages, such as session initiation protocol (SIP) messages or wireless application protocol (WAP) push messages. This approach is preferred when the mobile station is engaged in an active data session.

SCP 24 may formulate the incoming call notification based on the information provided in the call state response of step 114. For example, if the call state response indicates that mobile station 14 is fully engaged in voice calls then SCP 24 may formulate the incoming call notification as an SMS message. If the call state response indicates that mobile station 14 is engaged in an active data session, then SCP 24 may formulate the incoming call notification as a SIP message or other packet protocol message. SCP 24 may also use the information from the call state response of step 114 to determine whether to send the incoming call notification to mobile station 14 or to some other destination. For example, if the call state response indicates that mobile station 14 is engaged in an active data session that may be delay-sensitive, then SCP 24 may send the incoming call notification to an alternate destination instead of to mobile station 14. The alternate destination may be a pager, a PDA, a computer, or other device associated with the user of mobile station 14.

SCP 24 may also consult the user's service profile to determine how to send the incoming call notification. For example, the user may want to receive only SMS messages, or only packet protocol messages. The service profile may also specify that the incoming call notification may, at least under certain conditions, be sent to an alternate destination.

SCP 24 may also maintain call history information regarding how the user has made use of the incoming call notification service in the past. SCP 24 may then consult the user's call history information to determine how to instruct home MSC 28. For example, if the user has been ignoring a certain number of incoming call notifications within a certain period of time, the SCP 24 may instruct home MSC 28 to handle the call in a default fashion, such as sending it to voice mail, rather than send another incoming call notification to mobile station 14.

Whatever form the incoming call notification takes, it preferably includes the information needed to provide the desired user-discernible indication by mobile station 14. For example, if the user-discernible indication includes the calling party's telephone number, then SCP 24 may formulate the incoming call notification so as to include the calling party's telephone number from the T_BUSY invoke of step 110. SCP 24 may also include in the incoming call notification other text to be displayed, such as an explanation to the user on how to take the incoming call. Alternatively, this and other elements of the user-discernible indication that are not dependent on the specifics of the incoming call may be specified by the message handling application in mobile station 14, rather than by the incoming call notification.

After SCP 24 formulates the incoming call notification, SCP 24 may transmit it to mobile station 14, as shown in step 116. Although, for the sake of simplicity, FIG. 3 shows SCP 24 transmitting the incoming call notification to mobile station 14 directly in step 116, the incoming call notification may actually be transmitted to mobile station 14 in several steps involving several network elements. Moreover, the details of how the incoming call notification reaches mobile station 14 may depend on the type of message used.

To send the incoming call notification as an SMS message, SCP 24 may first send to HLR 22 an IS-771 SEARCH invoke identifying mobile station 14, and HLR 22 may respond with the MSC ID of the MSC currently serving mobile station 14, i.e., serving MSC 18. SCP 24 may then send an SMDPP message, containing the text to be displayed on the mobile station, to serving MSC 18. This point-to-point transmission advantageously bypasses the message center (MC) that is normally used to deliver SMS messages, so that the incoming call notification message will be delivered to the mobile station in real time. Serving MSC 18, in turn, transmits the text, as an SMS message, to mobile station 14, via a paging channel.

To send the incoming call notification using SIP, SCP 24 may send a SIP request to SIP proxy server 46 addressed to a mobile directory number corresponding to mobile station 14. In a preferred embodiment, the SIP request is of the MESSAGE method type and contains text to be displayed by mobile station 14. Other SIP methods, such as INVITE, could also be used. SIP proxy server 46, in turn, forwards the SIP request to PDSN 38, either directly or via one or more other SIP proxy servers. To locate PDSN 38 as the node serving mobile station 14, these SIP proxy servers may query one or more location servers or other databases. Once PDSN 38 receives the SIP request, it forwards it to BSC/PCF 16, and BTS 12 transmits it over an air interface to mobile station 14.

Alternatively, instead of querying call state server 48, SCP 24 may use other means to determine how to send the incoming call notification. For example, the T_BUSY invoke of step 110 may indicate whether mobile station 14 is busy in voice calls or an active data session. Alternatively, SCP 24 may simply send either an SMS message or a packet protocol message, or both, without determining how mobile station 14 is fully engaged.

In addition to formulating and transmitting the incoming call notification, SCP 24 sends home MSC 28 an IS-771 t_busy return result, as shown in step 118, in order to instruct home MSC 28 how to handle the incoming call. The t_busy return result of step 118 preferably instructs home MSC 28 to play an announcement to the caller, as shown in step 120. The announcement to the caller may be used to take up the time allotted for the user of mobile station 14 to decide whether to take the incoming call. Thus, the announcement may, for example, ask the caller to be patient because the call may take some time to go through.

The t_busy return result of step 118 may also instruct home MSC 28 to make another attempt to terminate the incoming call after playing the announcement of step 120. The purpose of this second termination attempt is to connect the incoming call to mobile station 14, in the event the user has, in the time allotted, accepted the incoming call in response to the incoming call notification, as described in more detail below.

Once mobile station 14 receives the incoming call notification of step 116, mobile station 14 preferably provides the user-discernible indication, as described above. If the user chooses one of the available options within the time allotted, mobile station 14 responsively transmits a signal indicating the user selection, as shown in step 122. In the example illustrated in FIG. 3, the user has chosen to take the incoming call, so the user selection of step 122 is an incoming call acceptance.

If the response to the incoming call acceptance of step 122 is an incoming call acceptance, serving MSC 18 drops one or more of the calls in which mobile station 14 is engaged so that the incoming call may be connected to mobile station 14. Thus, if mobile station 14 is engaged in an active data session, then serving MSC 18 may drop the data session. If mobile station 14 is engaged in voice calls, then serving MSC 18 may drop one or more of the call legs that mobile station 14 is using.

During the period of time allotted for the user to accept the incoming call, home MSC 28 plays the announcement of step 120. When the announcement of step 120 is completed, home MSC 28 sends another LOCREQ invoke to HLR 22, as shown in step 124, in accordance with the instructions provided by the t_busy return result of step 118. HLR 22, in turn, responsively sends another ROUTEREQ invoke to serving MSC 18, as shown in step 126.

However, in the example of FIG. 3 the user has accepted the incoming call within the allotted time period. As a result, when serving MSC 18 receives the ROUTEREQ of step 126, serving MSC 18 will have dropped one or more calls such that mobile station 14 is no longer fully engaged. Accordingly, in response to the ROUTEREQ of step 118, serving MSC sends back to HLR 22 a routereq return result containing a TLDN, as shown in step 128. HLR 22, in turns, sends to home MSC 28 a locreq return result containing the TLDN, as shown in step 130. Using this TLDN, home MSC 28 routes the incoming call to serving MSC 18 by exchanging SS7 ISUP messages, as shown in step 132. Once the incoming call is routed to serving MSC 18, serving MSC 18 pages and alerts mobile station 14, as shown in step 134.

If the user does not accept the incoming call within the allotted time period, then mobile station 14 will still be fully engaged. Thus, in response to the ROUTEREQ of step 118, serving MSC 118 may respond with a routereq return result that, once again, indicates mobile station 14 is busy. When the busy indication reaches home MSC 28, home MSC 28 may send SCP 24 a T_BUSY invoke, as before.

This time, however, SCP 24 may respond differently. Specifically, the service logic that SCP 24 uses to process the T_BUSY invoke may provide for alternate handling of the incoming call if SCP 24 receives two T_BUSY invokes involving the same telephone numbers within a certain period of time. For example, in response to the second T_BUSY invoke, SCP 24 may instruct home MSC 28 to send the incoming call to an alternate location or number, such as a voice mail system, or an interactive voice response (IVR) system, or to take some other alternate action.

Figure 4:
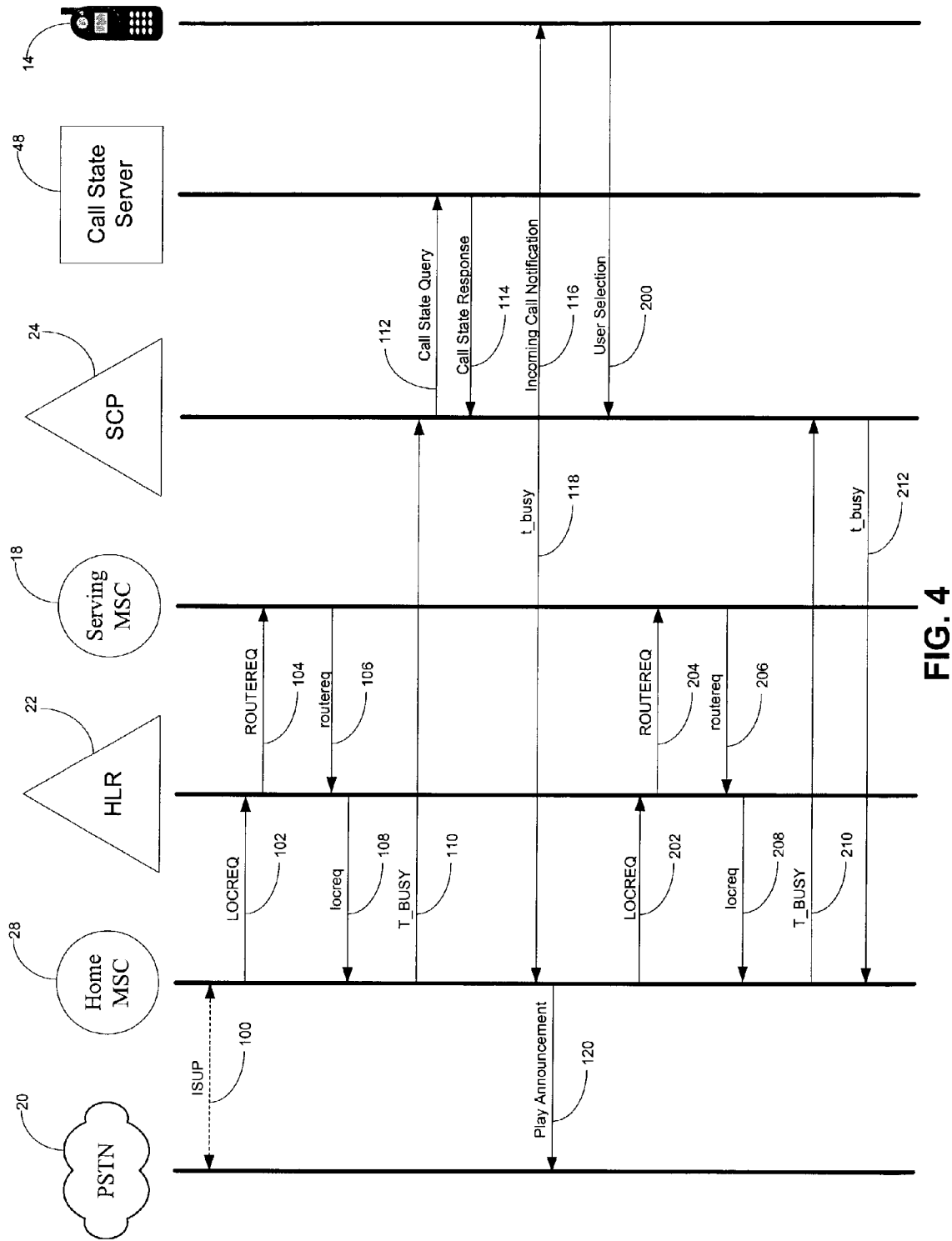
FIG. 4 is a simplified call flow diagram illustrating an incoming call notification service, in accordance with an exemplary embodiment of the present invention.

FIG. 4 illustrates an exemplary call flow for the case where the user selection in response to the incoming call notification is other than an incoming call acceptance. For example, the user selection may be to forward the incoming call to a voice mail system or to another telephone number or to handle the incoming all in some other fashion.

In the example of FIG. 4, the call flow may be similar to the example of FIG. 3 up to the point where the user has selected a response to the incoming call notification and mobile station 14 has transmitted the user selection, as shown in step 200. The user selection of step 200 is preferably a message that is sent to SCP 24. For example, the user selection may be transmitted as a SIP message, as a mobile-originated SMS message, or as some other message.

When home MSC 28 is finished playing the announcement of step 120, it transmits a LOCREQ invoke to HLR 22, shown in step 202, in accordance with the instructions of the t_busy return result of step 118. HLR 22 responsively sends a ROUTEREQ invoke to serving MSC 18, as shown in step 204. In this example, however, the user has not simply accepted the incoming call, so mobile station 14 is still fully engaged. Accordingly, serving MSC 18 once again sends back to HLR 22 a routereq return result indicating that mobile station 14 is still busy, as shown in step 206. HLR 22 forwards the busy indication to home MSC 28 in a locreq return result, as shown in step 208.

In response to the busy indication, home MSC 28 again sends SCP 24 a T_BUSY invoke, as shown in step 210. By this time however, SCP 24 has received the user selection of step 200. Thus, in response to the T_BUSY of step 210, SCP 24 sends home MSC 28 a t_busy return result in step 212 that instructs home MSC 28 how to handle the incoming call in accordance with the user selection.

3. Call State Server

As noted above, wireless telecommunications system 10 may include a call state server 48 that keeps track of the call state of mobile stations, such as mobile station 14. The call state information may specify whether a given mobile station is: (1) not busy; (2) busy on one voice call; (3) busy on two or more voice calls; or (4) busy on an active data session. In cases (2) and (3), the mobile station is fully engaged. With respect to case (3), a mobile station may, for example, be busy on two or more voice calls because it is using call waiting to be connected to two or more calls or because it is using two or more call legs for a conference call, such as three-way calling. With respect to case (4) the mobile station may be engaged in an active data session via BSC/PCF 16 and PDSN 38, a "3G" data session, or via serving MSC 18 and IWF 44, a "2G" or CSD data session. In case (4), call state server 48 may also specify the type of data session, such as web browsing or VoIP.

SCP 24 may keep track of the number of voice calls mobile station 14 is engaged in and may provide this information to call state server 48. For example, serving MSC 18 may be provisioned with triggers that cause it to signal SCP 24 whenever a mobile station that it is serving, such as mobile station 14, originates a call, answers a call, or ends a call. In this way, SCP 24 will know when mobile station 14 is engaged in voice calls. SCP 24 may push this information to call state server 48 at appropriate times, such as whenever a change in the call state of mobile state 14 occurs. Alternatively, call state server 48 may query SCP 24 to obtain the call state information.

Call state server 48 may determine whether mobile station 14 is engaged in an active data session in a number of different ways. In one approach, BSC/PCF 16 may keep track of the state of the data session, i.e., whether active or dormant. Thus, BSC/PCF 16 may push this information to call state server 48 at appropriate times, such as when a change occurs.

In another approach, PDSN 38 may, in accordance with the RADIUS accounting protocol, send AAA server 42 a START message when it starts service delivery to mobile station 14 and a STOP message when it stops service delivery. Moreover, each STOP message may include a flag indicating whether the data session is being continued, i.e., whether the data session has been torn down or is simply dormant. Thus, AAA server 42 may push the information from the START and STOP messages to call state server 48, or call state server 48 may query AAA server 42 to obtain the information. Further details regarding this approach are described in the U.S. Patent Application, identified as Ser. No. 1952 and titled "Method and System for Network Presence Notification," which is filed concurrently herewith and which is fully incorporated herein by reference.

For CSD sessions, either serving MSC 18 or IWF 44 could push the session status to call state server 48. For CSD sessions, there typically is no distinction between active and dormant data sessions. The session status may simply be whether mobile station 14 is connected to packet-switched network 34 in a CSD session via IWF 44.

Call state server 48 may also maintain information about the type of data session mobile station 14 is engaged in from the one or more application servers 36 involved in the session. For example, if mobile station 14 is engaged in a VoIP teleconferencing session, then a teleconferencing server involved in the session may push this information to call state server 48.

4. CONCLUSION

In exemplary embodiments, the user of a mobile station that is fully engaged, i.e., a mobile that is involved in one or more existing calls and cannot be connected to an incoming call without being disconnected from one of the existing calls, may, nonetheless, be notified of an incoming call. The user may also be able to signal the mobile station to drop one or more of the existing calls and take the incoming call. Even if the user does not take the incoming call, the incoming call notification may identify the caller, so that the user may call the caller back at a convenient time. Advantageously, the wireless telecommunications network may provide this incoming call notification service without placing large additional demands on its resources. In contrast, with call waiting when the user accepts an incoming call, the existing calls are placed on hold or suspended, rather than disconnected, thereby tying up network resources.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of incoming call notification for a mobile station, said mobile station being connected to at least one call over an air interface, said method comprising:

detecting a request to connect an incoming call to said mobile station;

making a determination that said mobile station is fully engaged such that said mobile station cannot be connected to said incoming call without being disconnected from at least one of said at least one call; and in response to said determination, transmitting an incoming call notification to said mobile station.

2. The method of claim 1, further comprising:

in response to said incoming call notification, said mobile station providing a user-discernible indication.

3. The method of claim 2, wherein providing a user-discernible indication includes said mobile station visibly displaying an incoming call notification message.

4. The method of claim 3, wherein said incoming call notification message identifies said incoming call.

5. The method of claim 4, wherein said incoming call notification message includes text identifying a calling party of said incoming call.

6. The method of claim 5, wherein said text includes a telephone number of said calling party.

7. The method of claim 1, further comprising:
receiving an incoming call acceptance from said mobile station; and
in response to said incoming call acceptance, disconnecting at least one of said at least one call and connecting said incoming call.

8. The method of claim 1, wherein said at least one call includes a voice call.

9. The method of claim 8, wherein transmitting an incoming call notification to said mobile station includes transmitting a short message service (SMS) message to said mobile station.

10. The method of claim 1, wherein said at least one call includes an active data session.

11. The method of claim 10, wherein transmitting an incoming call notification to said mobile station includes transmitting a packet protocol message to said mobile station.

12. The method of claim 11, wherein said packet protocol message is a session initiation protocol (SIP) message.

13. The method of claim 12, further comprising:
receiving an incoming call acceptance from said mobile station; and
in response to said incoming call acceptance, disconnecting said active data session and connecting said incoming call.

14. The method of claim 1, wherein said at least one call includes a first voice call and a second voice call.

15. The method of claim 14, further comprising:
receiving an incoming call acceptance from said mobile station; and
in response to said incoming call acceptance, disconnecting said first voice call and said second voice call and connecting said incoming call.

16. The method of claim 1, wherein said at least one call includes a voice call and an active data session.

17. The method of claim 1, further comprising:
detecting whether said mobile station is engaged in an active data session;
if said mobile station is engaged in an active data session, transmitting said incoming call notification to said mobile station as a packet protocol message; and
if said mobile station is not engaged in an active data session, transmitting said incoming call notification to said mobile station as a short message service (SMS) message.

18. The method of claim 17, wherein said packet protocol message is a session initiation protocol (SIP) message.

19. The method of claim 1, wherein transmitting an incoming call notification to said mobile station includes transmitting a short message service (SMS) message to said mobile station and transmitting a packet protocol message to said mobile station.

20. The method of claim 19, wherein said packet protocol message is a session initiation protocol (SIP) message.

* * * * *